(12) United States Patent
Buchet

(10) Patent No.: US 8,454,875 B2
(45) Date of Patent: Jun. 4, 2013

(54) METHOD AND DEVICE FOR PRODUCING MOLDED PARTS WITH DIFFERENT DECORATIVE REGIONS

(75) Inventor: Yann Buchet, Strasbourg (FR)

(73) Assignee: Peguform GmbH, Bötzingen (DE)

( * ) Notice: Subject to any disclaimer, the term of this patent is extended or adjusted under 35 U.S.C. 154(b) by 83 days.

(21) Appl. No.: 13/062,722

(22) PCT Filed: Sep. 1, 2009

(86) PCT No.: PCT/EP2009/006318
§ 371 (c)(1),
(2), (4) Date: Mar. 8, 2011

(87) PCT Pub. No.: WO2010/025887
PCT Pub. Date: Mar. 11, 2010

(65) Prior Publication Data
US 2011/0180961 A1 Jul. 28, 2011

(30) Foreign Application Priority Data

Sep. 8, 2008 (DE) .......... 10 2008 046 084

(51) Int. Cl.
*B29C 45/14* (2006.01)
*B29C 45/03* (2006.01)

(52) U.S. Cl.
USPC ........... 264/255; 264/266; 264/275; 264/278; 264/294; 264/267; 264/263; 425/127; 425/129.1; 425/112; 425/125; 425/577; 425/588

(58) Field of Classification Search
None
See application file for complete search history.

(56) References Cited

U.S. PATENT DOCUMENTS

| 4,978,407 | A | * | 12/1990 | Ardissone | 156/216 |
| 5,509,990 | A | * | 4/1996 | Masui et al. | 156/242 |
| 5,624,523 | A | * | 4/1997 | Stiller | 156/285 |
| 5,968,440 | A | * | 10/1999 | Hettinga | 264/328.1 |
| 6,093,272 | A | * | 7/2000 | Visconti et al. | 156/219 |
| 6,673,296 | B2 | * | 1/2004 | Hiraiwa et al. | 264/275 |
| 7,981,236 | B2 | * | 7/2011 | Muller et al. | 156/213 |
| 2005/0093203 | A1 | | 5/2005 | Kobayashi et al. | |

FOREIGN PATENT DOCUMENTS

| DE | 199 58 316 C1 | 2/2001 |
| DE | 100 39 332 A1 | 2/2002 |
| DE | 103 20 210 A1 | 12/2004 |
| DE | 102005029849 | 1/2007 |
| EP | 0 249 363 | 12/1987 |
| EP | 0 376 263 B1 | 7/1990 |
| EP | 0 582 075 A1 | 2/1994 |
| EP | 0 584 042 A | 2/1994 |
| EP | 1 120 220 A1 | 8/2001 |
| EP | 1 160 070 A | 12/2001 |
| EP | 1 655 122 A1 | 5/2006 |
| EP | 2 070 680 A1 | 6/2009 |
| JP | 61 230920 A | 10/1986 |
| JP | 05 024070 A | 2/1993 |
| JP | 07 195433 A | 8/1995 |
| JP | 09 039003 A | 2/1997 |
| JP | 2004249487 | 9/2004 |
| JP | 2005 280227 | 10/2005 |
| JP | 2008 030300 | 2/2008 |

* cited by examiner

*Primary Examiner* — Edmund H. Lee
(74) *Attorney, Agent, or Firm* — Henry M. Feiereisen, LLC; Ursula B. Day

(57) ABSTRACT

The present invention refers to a method and to a device fro producing a molded port having a plurality of different decorative regions that abut each other, wherein the different decorative films (9, 10) are inserted into a molding tool (1) by a gripper (4). There they are fixed be means of sliders (8) and are then back molded with a thermoplastic material.

8 Claims, 10 Drawing Sheets

METHOD AND DEVICE FOR PRODUCING MOLDED PARTS WITH DIFFERENT DECORATIVE REGIONS

CROSS-REFERENCES TO RELATED APPLICATIONS

This application is the U.S. National Stage of International Application No. PCT/EP2009/006318, filed Sep. 1, 2009, which designated the United States and has been published as International Publication No. WO 2010/025887 and which claims the priority of German Patent Application, Serial No. 10 2008 046 084.2, filed Sep. 8, 2008, pursuant to 35 U.S.C. 119(a)-(d).

BACKGROUND OF THE INVENTION

The present invention refers to a molded part that includes a plurality of different decorative regions that adjoin each other and a method and device for the production thereof, by means of back molding several decorating films placed into a mold tool which includes a mold tool core and mold tool matrix.

The present invention refers also to a mold tool for the production of a molded part having several adjoining different decorating regions.

It is known to upgrade certain portions of mold tools for interior paneling for automotive vehicles into decorating areas with materials such as textiles, plastic films, felt or carpet materials, leather or leather imitations. The decorating areas can include, besides optical or haptic properties, also special technical functions. Normally, for the production of molded parts having integrated decorating areas, corresponding textiles or decorating films are placed into a mold tool and subsequently back molded with thermoplastic material, whereby the edges of the decorating element are usually treated in a separate work step and before the final completion of the molded part.

In order to provide a molded part with different surface structures of decorating areas, oftentimes two or more separated parts having different surface structures are produced as semi-finished goods in different mold tools and subsequently combined. This manner of production has the drawback that several production steps as well as transporting steps have to be carried out and coordinated with each other requiring a considerable amount of time and production expenditures.

In EP 1 655 122 A1, a method for the production of plastic molded parts is described where during the first production step, a first textile or decorating film is placed into a mold tool, then back molded and subsequently, a partial section is stamped out from the so produced semi-finished product. In a second step, the second textile or decorating film is then placed instead of the removed section of the semi-finished work piece and the semi-finished work piece is then finished in the area of the second textile or the second decorating film. For this method several working steps are likewise necessary in order to produce a molded part with different decorated regions.

In almost all known and practiced methods for the production of molded parts for interior paneling for motor vehicles having differently decorated areas, it is customary that either during the production of the molded part or at the latest, after the completion of the molded part, a cutting of the edges of the decorating areas has to be carried out, in order realize a fitted and optically perfect placement of the decorating element in the molded part. A neat and optically perfect execution of the marginal region of a decoration is in general a big problem in the production of such molded parts.

In laid open publication DE 10 2005 029 849 A1, a method is described for the production of a composite element for a motor vehicle, wherein at least two flat portions of an outer skin are placed next to each other in a common mold tool and provided in the mold tool across the entire surface with a common support structure. In this method it is contemplated to place portions of the outer skin as separated portions into the mold tool, whereby neighboring portions of the outer skin are sealingly overlapping at their edges. The disadvantage of this method is that the transitional regions between each of the different surfaces exhibit a rather stark optical border between the surfaces, such that this method is suitable only for the production of automotive body parts in exterior areas, where such transitions are either wanted or are hidden by means such as, for example a cover strip. For the production of molded parts with different decorating regions for the interior paneling for automotive vehicles or for door panels, this afore-described method is not suitable.

In DE 103 20 210 A1, interior paneling parts with decorating elements are described where the marginal area of the decorating element is circumferentially covered by a decorating element marginal region, whereby a flat adjoining connection between decorating element, marginal region and decorating element marginal region is realized. While that method solved the problem of the image of an uneven juncture line along the marginal area of the decorating element, without additional cutting of the decorating film, any exact line of the junctures or edges between the decorating element and the paneling can be realized only in that a multitude of different components will be glued together or combined which is very labor intensive.

There is thus the continued problem to find a method for the production of molded parts where several different decorating regions adjoining each other for the interior panel purposes of motor vehicles, with the aid of which it is possible to insert decorating regions into the molded part, that requires no additional means such as subsequent cutting or covering the marginal areas in order to realize a neat, and optically perfect transition between each of the decorating regions where the juncture line of each region is precisely delineated.

SUMMARY OF THE INVENTION

Such objects are solved by means of a method that includes the features of claim 1, a device having features of claim 7, as well a molded part having features of claim 10. Preferred embodiments of the method according to the present invention, of the device according to the present invention and the molded part according to the present invention are reflected in the respective dependent claims.

With a mold tool that consists essentially of a mold tool core and a mold tool matrix, it is possible to produce plastic molded parts with different decorating regions, whereby finishing work or additional covering of the margin areas of the decorating element is not longer required. This mold tool is combined with a gripper which includes a movable gripper frame and gripper plate such that the different decorating films are arranged at the gripper. Thus, the decorating films are placed arranged by their margins in the area of the gripper frame overlapping each others margin areas. With the help of the gripper, the decorating films are placed into the cavity of a mold, whereby the overlapping decorating film margins are pressed into grooves that are provided in correspondence to the gripper frame in the mold tool. Thereby, the decorating films are being fixed at the surface of the mold tool.

To hold the decorating films at the surface of the mold tool even when the gripper is moving out of the mold tool, sliders integrated in the mold tool core are activated in the area of the grooves, which in turn engage in the grooves and which move the gripper frame from the grooves, such that at the same time they are fixing the decorating film. After the gripper is removed from the area of the mold tool, the mold tool is closed by means of mold tool matrix, wherein the mold tool matrix includes webs that, according to the present invention correspond to sliders integrated into the mold tool core, wherein after the mold tool is closed, the webs now separate the different decorating regions from each other. Upon the core-side back molding of the decorating films, each of these are being pressed against the matrix surface or their margin areas are pressed against the afore-described webs.

After opening the mold tool, the molded part emerges with two neighboring different decorating regions separated by a narrow groove disposed in the support of the molded part, into which the margins of each of the decorating films that cover the decorating regions are inserted. The webs that are arranged at the matrix are preferably dimensioned such that grooves in the support resulting from them are very narrow and the margins of the decorating regions are neatly separated from each other and the clean optical impression is fulfilled. In an advantageous embodiment of the present invention, the groove that separates the two decorating regions is kept so small, that the margins of each of the decorating regions are almost directly adjoining each other.

As decorating films, textiles decorating fabrics plastic films carpet fabrics leather or leather imitations can be used.

For the back molding of the decorating films normally thermoplastic materials are used wherein suitable plastics such as polypropylene (PP), polyethylene (PE), polyurethane (PU), acryl nitril-butadiene-styrene (ABS), acryl nitril-butadiene-styrene/polycarbonate co-polymerisate (ABS-PC) or polyamide.

An advantageous embodiment of the present invention provides that several movable sliders are provided as gripper frames that, according to need are taking up each of the single films and insert them into the grooves of the mold tool core.

A further advantageous embodiment of the present invention provides that the gripper includes gripper plate which projects from the gripper plane and which is supported by springs for pressing the decorating films to the surface of the mold tool core to be fixed there.

The present invention refers also to a device for the production of molded parts with several different decorating regions that adjoin each other, wherein the device includes a mold tool matrix and a gripper with a gripper plate and movable gripper frame for placing different decorating films that overlap in the margin areas into the mold tool. The gripper frame inserts the decorating film margins into the grooves provided in the mold tool core, which in turn are combined with sliders that are integrated into the mold tool core by means of which the gripper frame can be later pressed from the grooves at the core. Thereby, the sliders in turn fix the decorating films at the mold tool surface. The device includes further a mold tool matrix that is provided webs that correspond to the sliders integrated in the mold tool core and that serve to separate the different decorating regions during, back molding of the molded part.

Advantageous embodiments of the present invention provide that the gripper frame includes several movable sliders that can operate independently from each other, and/or that include a spring-loaded gripper plate projecting from the gripper plate.

BRIEF DESCRIPTION OF THE DRAWING

In the following paragraphs the present invention is described in more detail with reference to the drawings, where it is shown in FIGS. 1 to 5 a cross section of each mold tool core in detail with a corresponding gripper during and after placement of the different decorating films into the mold tool.

DETAILED DESCRIPTION OF PREFERRED EMBODIMENTS

Figure 1:
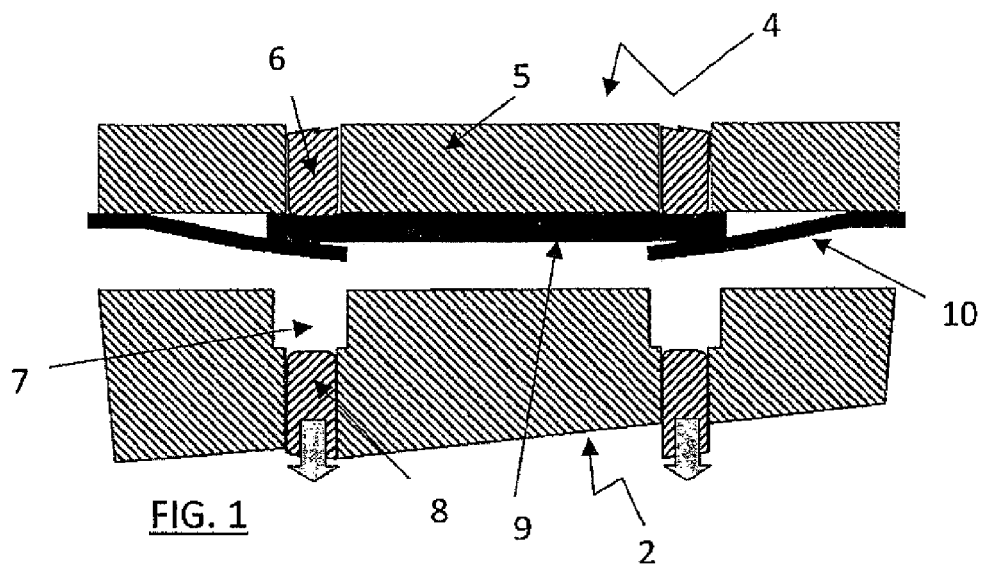

FIGS. 1-5 show the cross section of details of the mold tool core 2 and the gripper 4 representing the general course of the method according to the present invention up to the different decorating films having been placed into the mold tool. FIG. 1 shows a detail of the gripper 4 where different decorating films 9 and 10 have been placed whose margins overlap each other in the area of the gripper frame 6. This illustration represents a point in time shortly before the placement of the films 9, 01 into the mold tool, where a detail of the mold core 2 is shown with the groves 7 which are arranged in correspondence to the gripper frame 6. In mold tool core 2, in the area of the grooves 7, each of integrated slider 8 is shown which correspond with the gripper frame 6 or the grooves 7.

Figure 2:
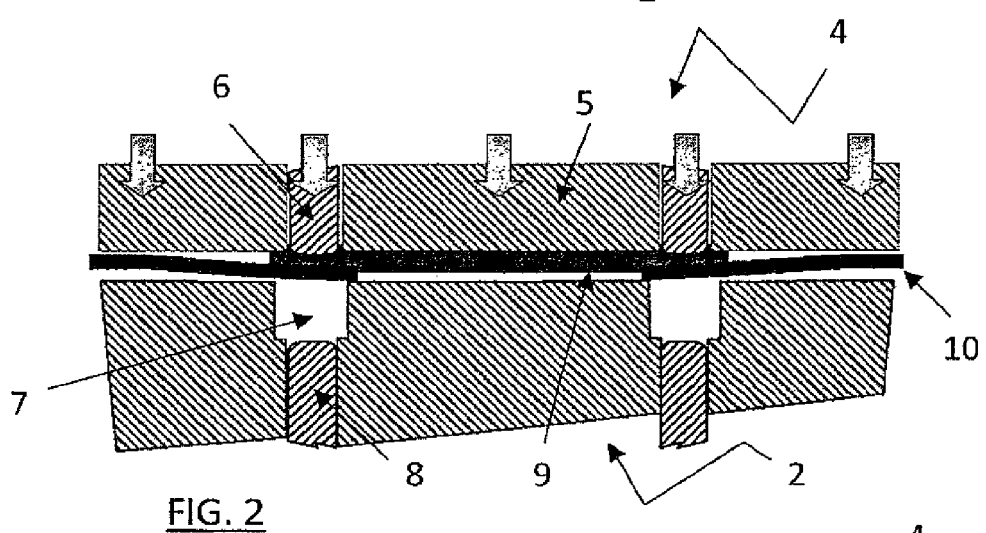

FIG. 2 illustrates in the same manner the next method step, wherein the decorating films 9 and 10 are placed by means of the gripper 4 on the surface of the mold tool core 2. The gripper frame 6 is still in the starting position and the margins of the decorating films 9 and 10 are overlapping above the grooves 7 on the mold tool core 2.

Figure 3:
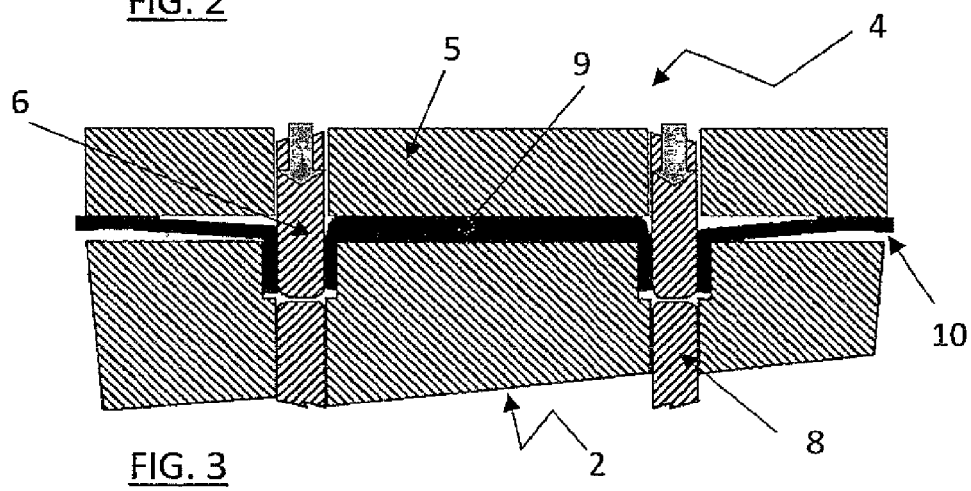

FIG. 3 illustrates the next method step, wherein the edges of the decorating films 9 and 10 are inserted into the grooves 7 arranged in the mold tool 2 by means of the gripper plate 6 and fixed at the surface of the mold tool core 2. By inserting the decorating films margins into the groove 7, the overlap has been eliminated and the edges of the decorating films 9, 10 each occupy the side walls of the groove 7.

Figure 4:
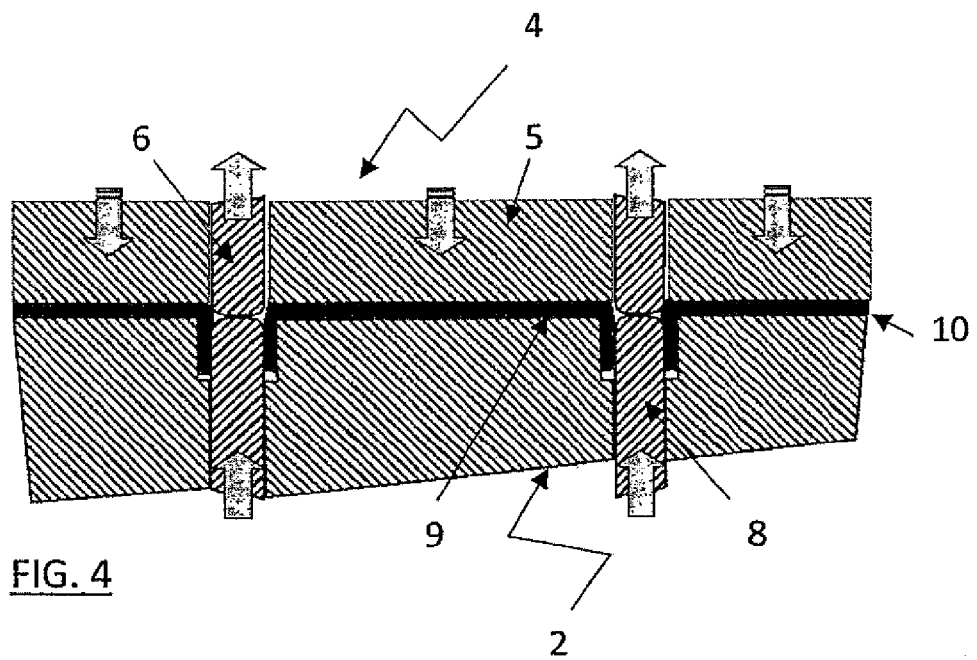

The step that follows is shown in FIG. 4, wherein the decorating films 9, 10 are fixed at the surface of the mold tool core 2 by means of the gripper 4 and the gripper frame 6 is displaced from the groove by means of the sliders 8 integrated into the mold tool core 2, while at the same time the films 9, 10 are being fixed in the groove by means of the slider 8.

Figure 5:
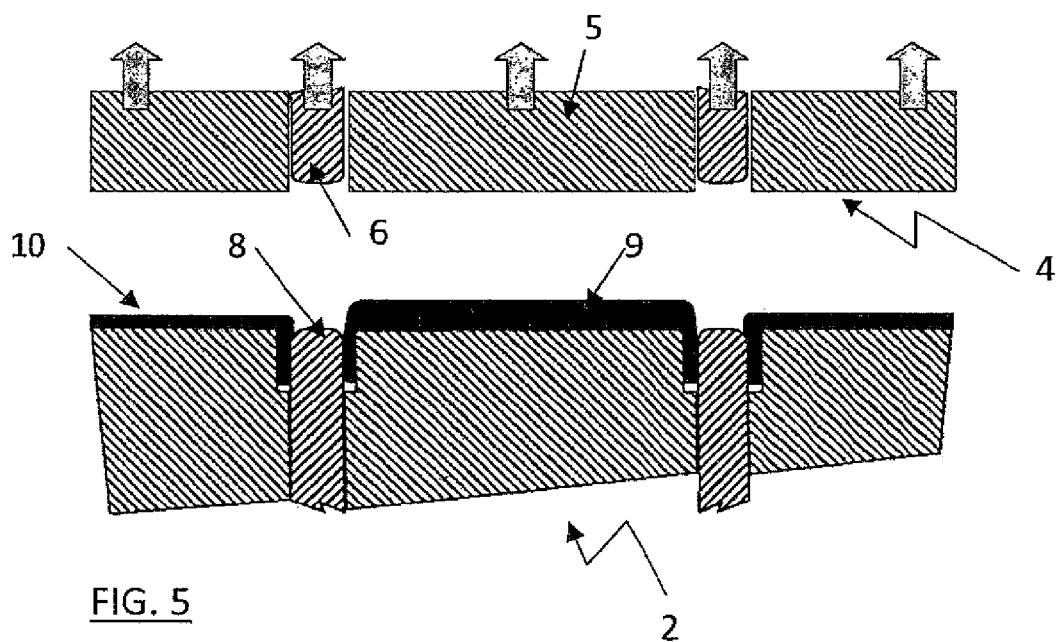

In FIG. 5, the placement step is completed and the gripper 4 including the gripper plate 5 and gripper frame 6 moves from the mold tool while at the surface of the mold tool core 2, the different decorating films 9 and 10 are fixed by the slider 8 and disposed separate from each other.

Figure 6:
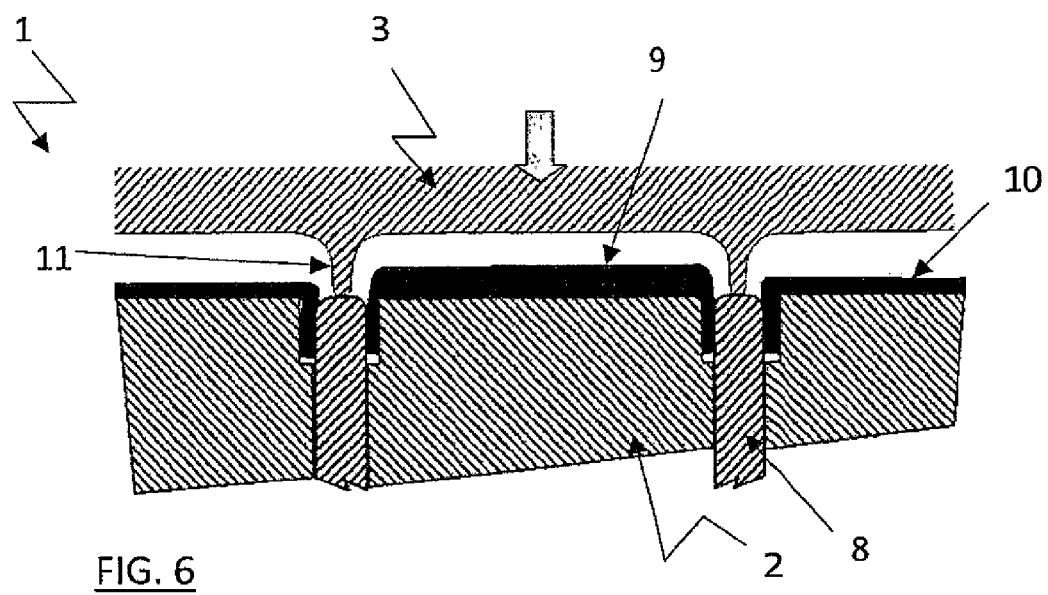
FIG. 6 a cross section in detail of the closed mold tool before back forming of the decorating films.

FIG. 6 shows the closed mold tool 1, wherein the molt tool matrix 3 now closes the mold tool 1, whereby the webs 11 corresponding to the sliders 8 form a connection with webs 11 and thereby divide the mold tool into single cavities.

Figure 7:
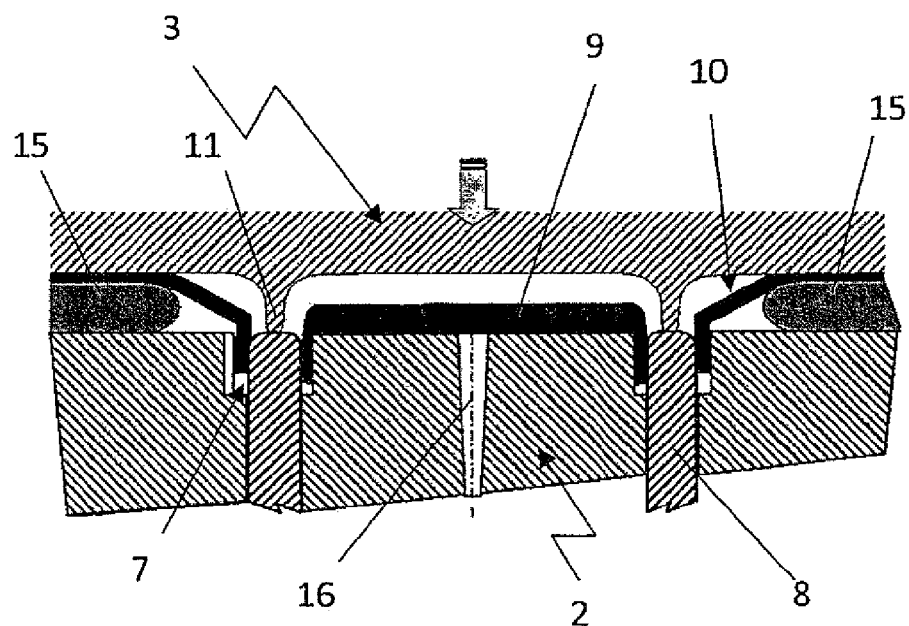
FIGS. 7 to 9 a cross section in detail of single back molding steps.
Figure 8:
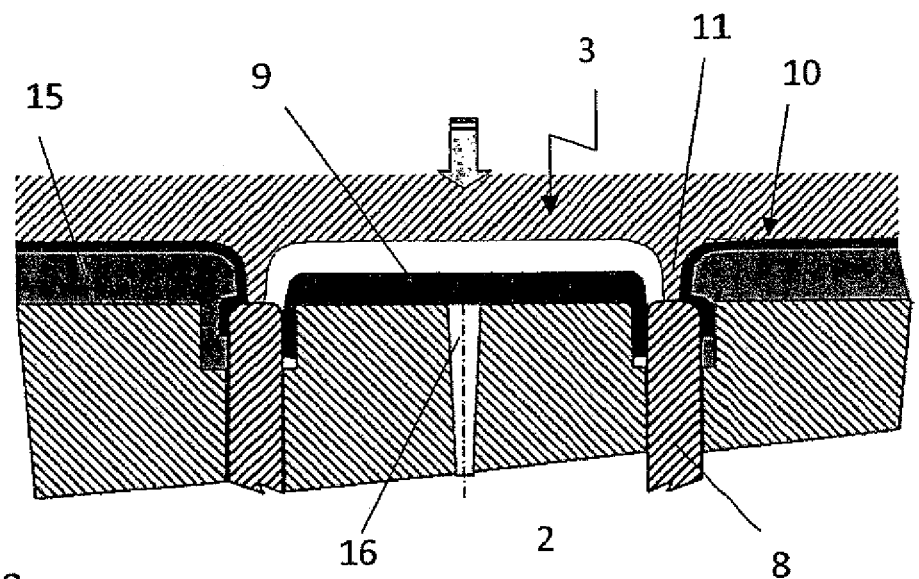
Figure 9:
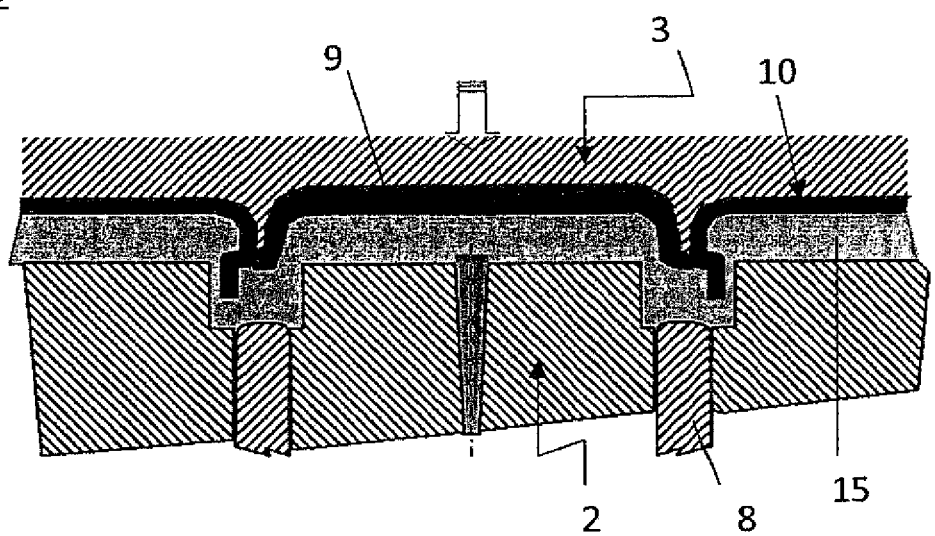

Each of the steps of the back molding is shown in FIGS. 7 to 9. FIG. 7 illustrates an injection channel 16 in mold tool 2, which is always present in the mold tool core, which however is not shown in most figures due to simplicity. FIG. 7 shows the point in time of the back molding of the outer decorating films 10 with the thermoplastic material 15. While the margin of the decorating film 10 is still clamped in the groove 7, the corresponding cavity of the mold tool is already partially filled with the thermoplastic material 15, whereby the surface of the decorating film 10 is being pressed against the matrix 3. The cavities for each of the different decorating regions are separated by the still existing connection between the slider 8 and web 11.

In FIG. 8, the decorating film 10 is entirely back molded and now adjoins with its margin at the web 11, while the cavities for each of the decorating areas remain separated and the back molding of the middle decorating film 9 has not yet started.

Figure 10:
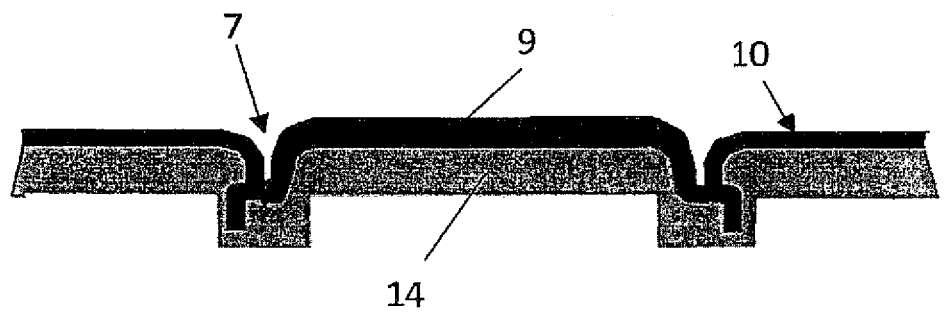
FIG. 10 a cross section of a detail from the finished molded part.

FIG. 9 shows the closed mold tool with an entirely back molded part. Thus, the sliders 8 have again taken their starting position and the cavities for each of the decorating regions are connected to each other and are filled entirely with thermoplastic material A cross section of the finished product (molded part) is shown in detail in FIG. 10, wherein the support 14 is covered with two different decorating films 9, 10 whose margins are each inserted into a groove 7. It has to be kept in mind, that these illustrations are drawings which should demonstrate the principle of the method and that the groove 7 in the molded part in reality is very narrow and each of the decorating areas border directly with each other and thus realize an optically perfect impression that the margins of the decorating area are neatly separated.

Figure 11A:
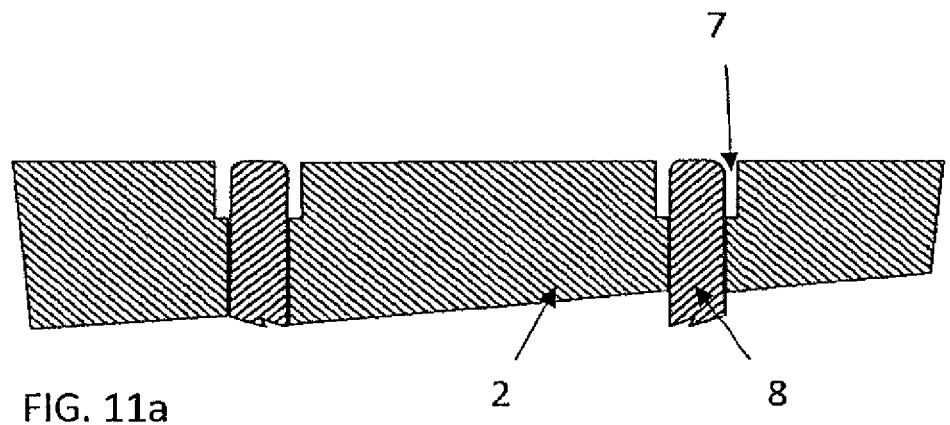
FIGS. 11a to 11c cross sections of different embodiments of the mold tool core.
Figure 11B:
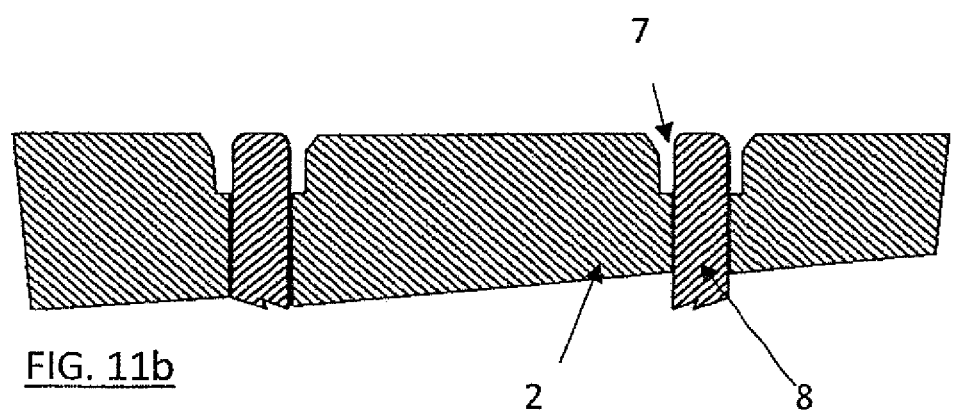
Figure 11C:
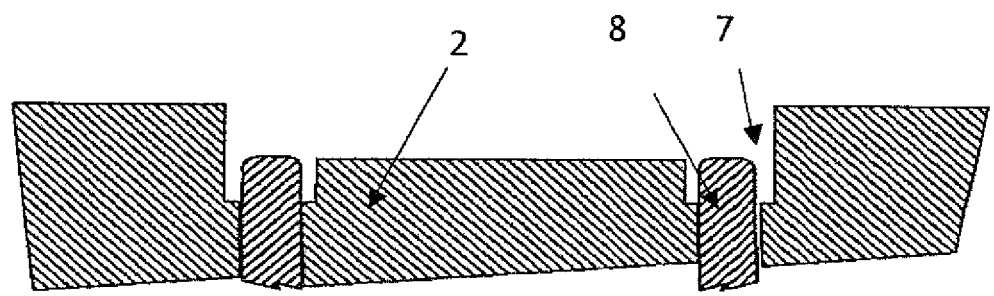

FIGS. 11a to 11c illustrate the cross sections of different embodiments of the mold core 2. In FIG. 11b, a groove 7 is shown with a slanted edge, for facilitating the insertion of the decorating film into the groove 7. In FIG. 11c an embodiment of the mold tool core 2 is shown which has been configured for the production of molded parts where the different decorating regions are additionally arranged in different planes of the molded part.

FIGS. 12a to 12d show the cross sections of several details of different embodiments of the gripper 4.

Figure 12A:
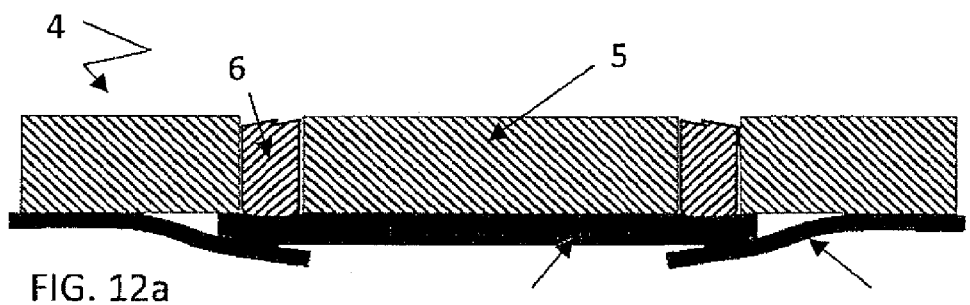
FIGS. 12a to 12d cross sections of different embodiments of the gripper.

Thus, FIG. 12a shows the simplest variant where the gripper 4 with gripper plate 5 is configured in one plane and wherein the gripper frame 6 is configured as a single piece.

Figure 12B:
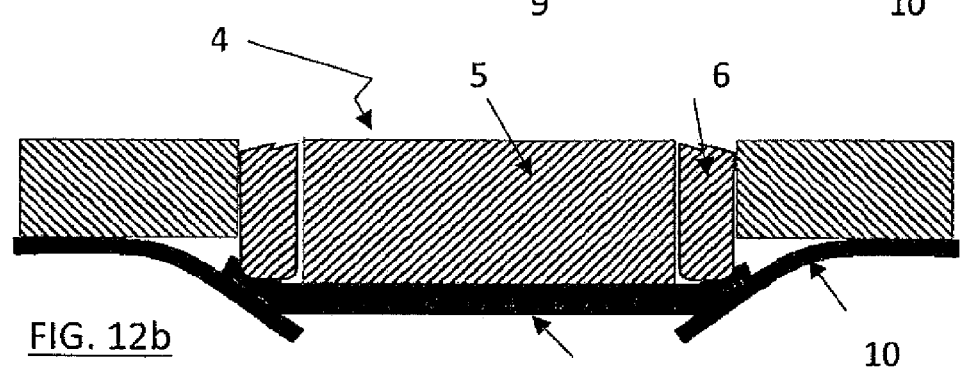

FIG. 12b shows a variant, where the gripper plate 5 is supported in the gripper in spring-loaded manner and projects together with the gripper frame 6 from the gripper plane. The advantage of this variant is that upon placement of the decorating films 9, 10, the decorating film 9, due to the spring force is firmly pressed to the surface of the mold tool core to thus prevent moving the film upon placement into the molded part. The spring itself is not shown in the illustration.

Figure 12C:
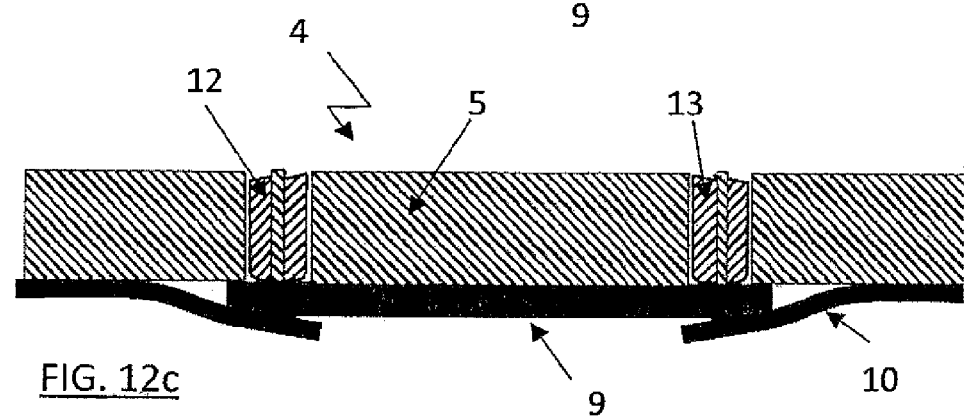

FIG. 12c shows a level arranged gripper 4 with a two-part gripper frame, where the gripper frame is composed of an inner slider 13 and an outer slider 12.

Figure 12D:
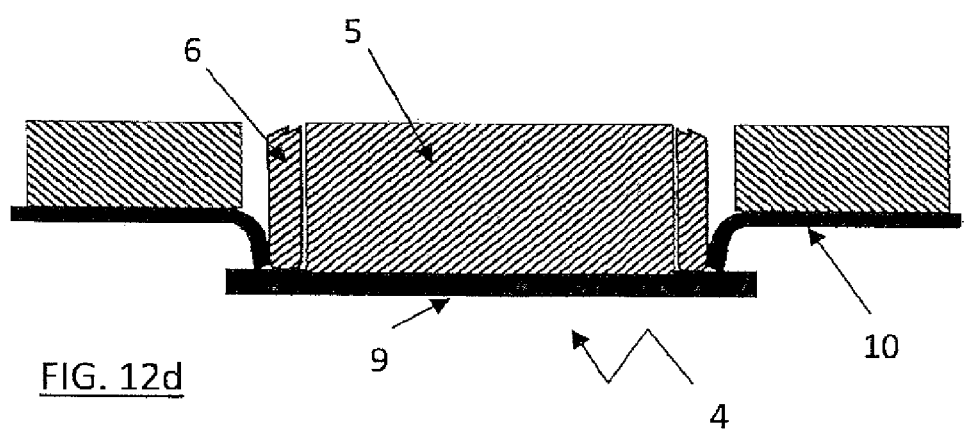
Figure 13:
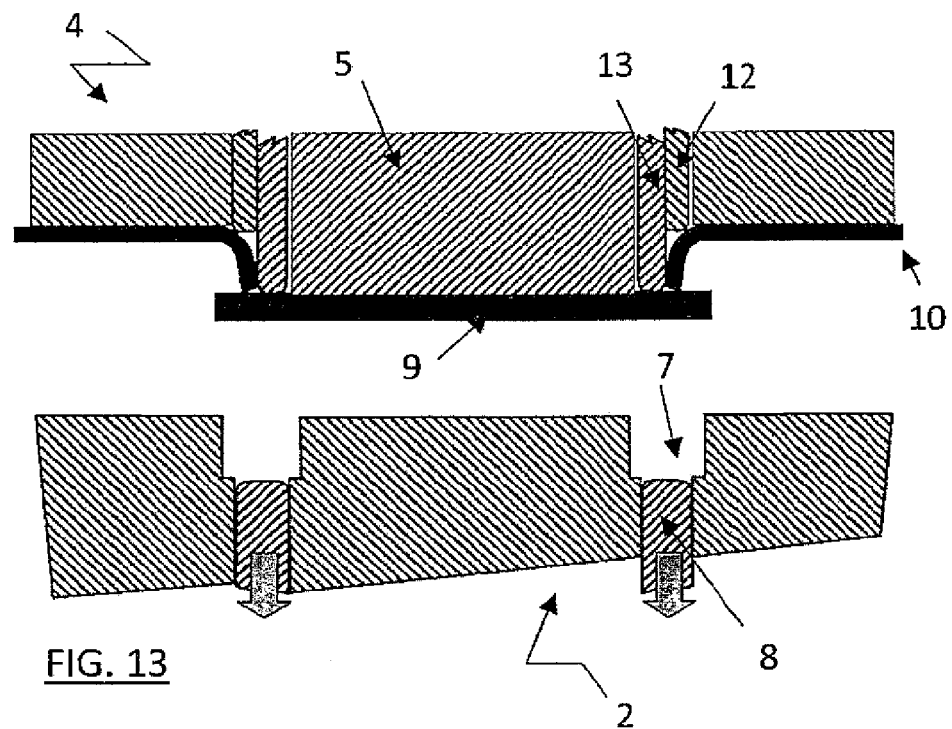
FIGS. 13 to 19 also a detail of the cross sections of gripper, mold tool and matrix during the method with a gripper having a movable double gripper frame.
Figure 14:
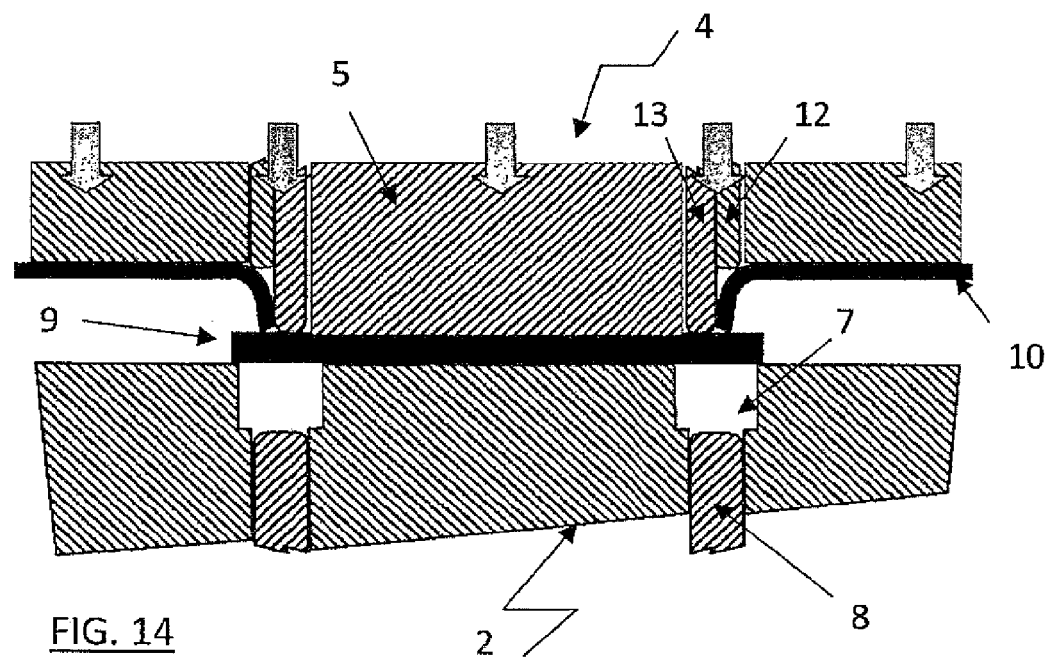
Figure 15:
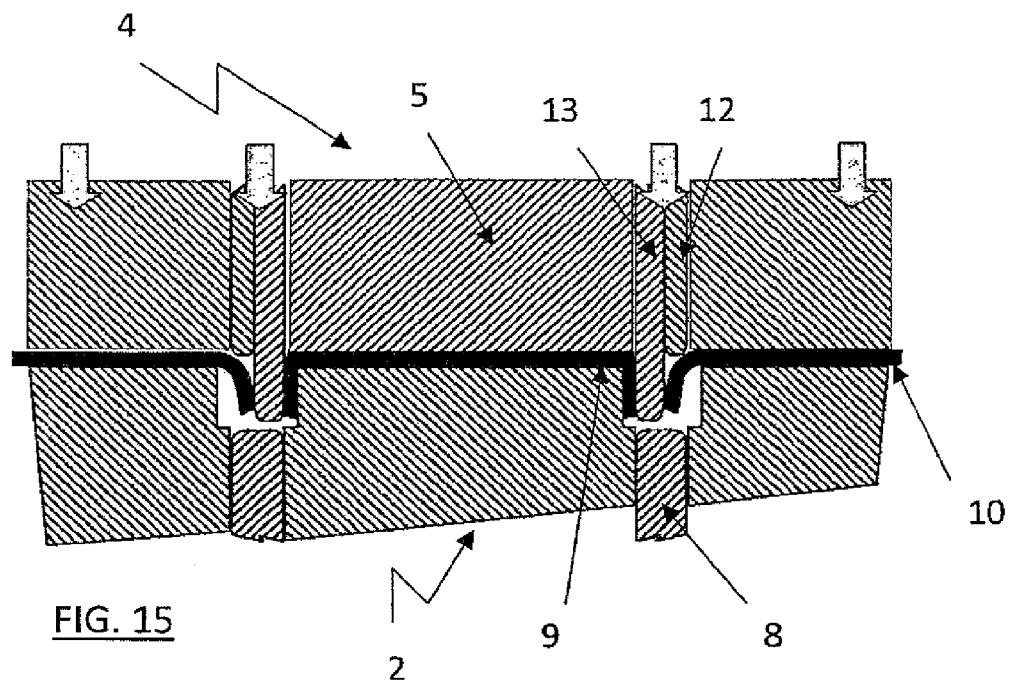
Figure 16:
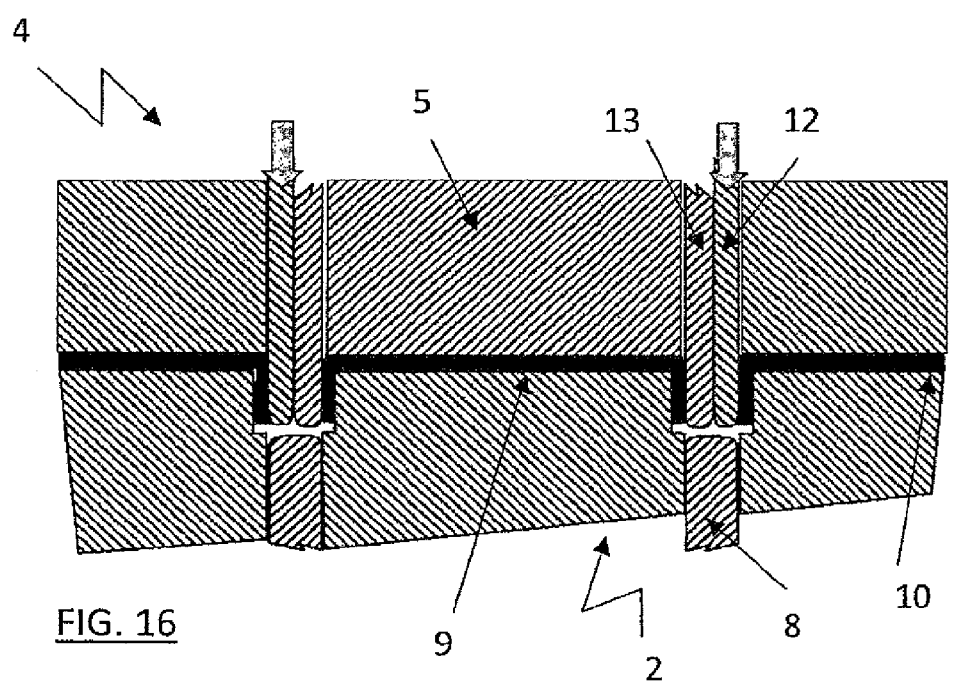
Figure 17:
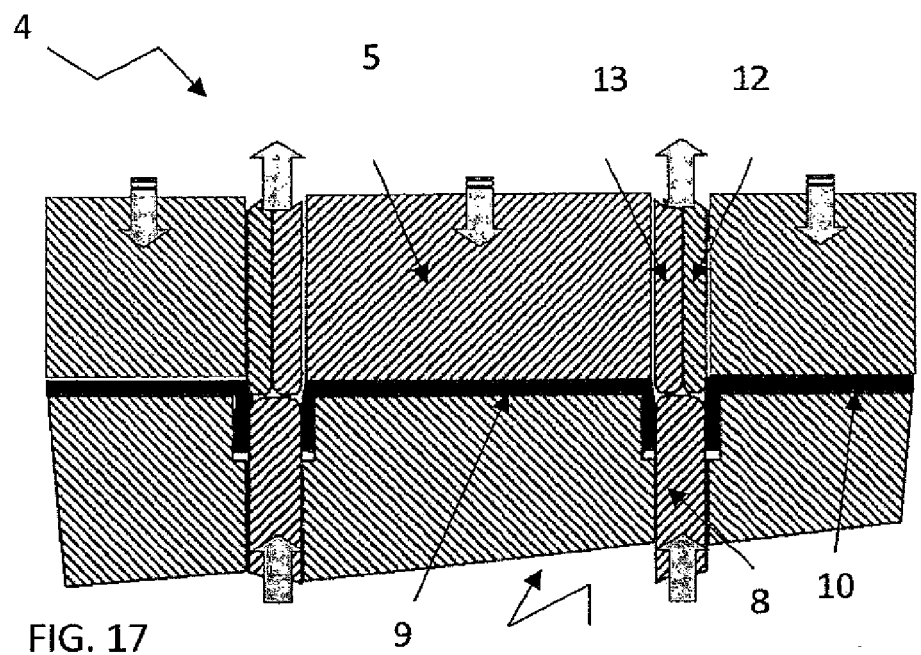
Figure 18:
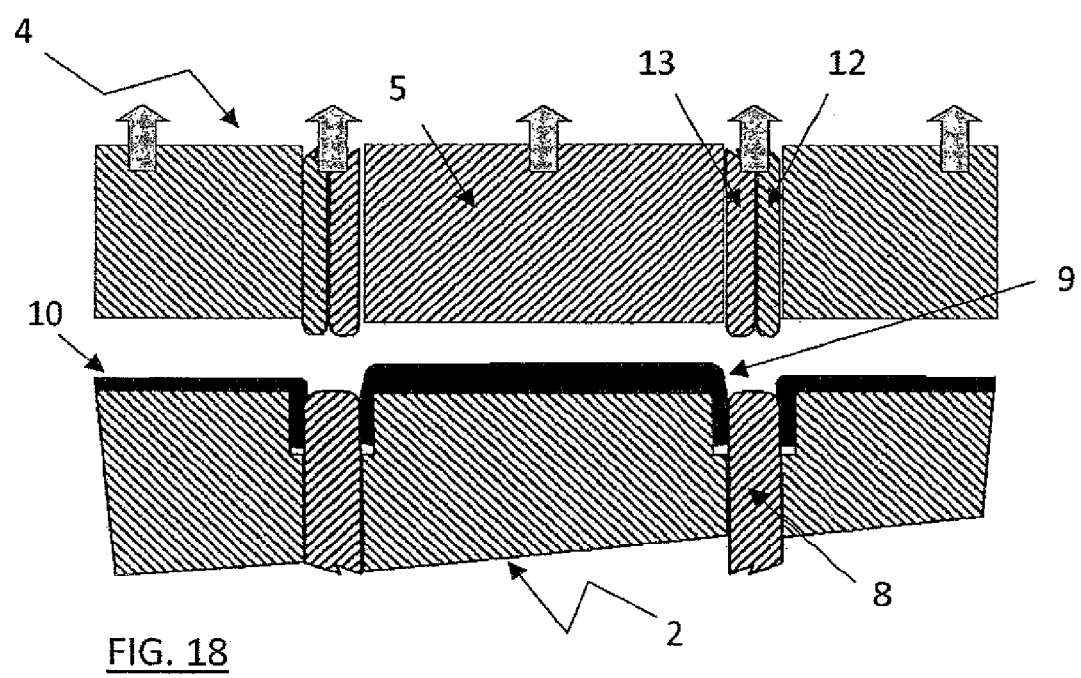
Figure 19:
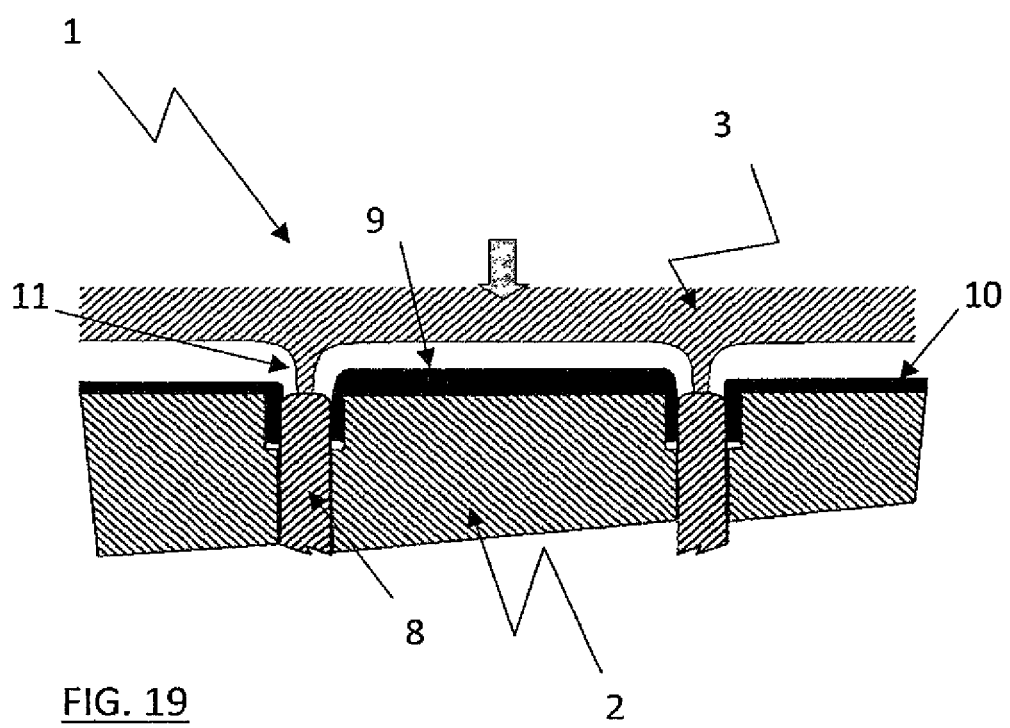

FIG. 12d shows a further embodiment of gripper 4, where the gripper plate 5 is spring loaded and projecting from the plane of the gripper and a gripper frame 6 provided for insertion of the different decorating films 9, 10 into the corresponding grooves in the mold tool core and disposed form-fitting relative to the gripper plate 5, while toward the gripper 4, it shows a gap to thereby realize a special kind of overlap of the different decorating films 9, 10. Depending upon each of the decorating films, this gripper variant can provide certain advantages. The spring is also not shown here.

FIGS. 13 to 19 each show cross section analogous to the course of the method as shown in FIGS. 1 to 6, illustrated with a two-piece gripper frame, wherein the gripper frame includes an inner slider 13 and an outer slider 12, which operate successively from the inside to the outside for insertion of each of the decorating films 9, 10 into the grooves 7. As the further method steps correspond to the method as explained in FIGS. 1 to 6, a detailed description of FIGS. 13 to 19 is not provided.

The above description and the corresponding illustrations which explain the principle of the method are directed essentially to two different decorating regions. It is however understood, this principle applies to as many different decorating regions as desired. The term decorating region does not only cover those regions that are covered by a decorating film but also any visible regions of a molded part whose surface is formed also directly on the support as a decoration, so that the principle of the present invention can be applied even with a single decorating film where, for example, relative to the above described figures only the middle decorating film 9 is placed into the mold tool by means of the gripper 4 with subsequent back molding of the cavities analogous to FIGS. 7 to 9, whereby the outer cavities are then filled directly with the thermoplastic material 15 and in these areas, the decorating surface formed in the matrix surface as a negative. The term decorating film according to the present invention also includes preformed decorating elements which are placed into the mold tool by means of gripper 4.

What is claimed is:

1. A method for production of a molded part having several adjoining different decorating regions comprising the following steps:
   a) disposing one or more decorating films at a gripper comprising a gripper plate and a movable gripper frame;
   b) placing, by means of the gripper, the decorating film into the cavity of the open mold tool;
   c) inserting an edge of the decorating film into grooves disposed in the mold tool core with the gripper frame;
   d) fixing the decorating film in the grooves by means of sliders integrated into the mold tool core and moving the sliders against the gripper frame engaged in the grooves, thus pressing the gripper frame out of the grooves, while at the same time, the gripper is pressing the decorating film against the mold tool core such that the sliders are clamping and fixing the decorating film;
   e) removing the gripper from the cavity of the mold tool;
   f) closing the mold tool with a matrix having corresponding webs extending into the grooves of the sliders of the mold tool core, and
   g) subsequently, back molding the decorating film at the core with a thermoplastic material while at the same time, withdrawing the sliders, wherein the decorating film is pressed against the surface of the matrix by the thermoplastic material and the different decorating regions are separated by the webs.

2. The method of claim 1, wherein the one or more decorating films are selected from the group consisting of textiles, decorating fabrics, plastic films, carpet fabrics, leather and leather imitations.

3. The method of claim 1, wherein the thermoplastic material is polypropylene, polyethylene, polyurethane, acryl nitril-butadiene-styrene, acryl nitril butadiene-styrene/polycarbonate co-polymerisate or polyamide.

4. The method of claim 1, wherein the sliders used at the gripper frame are movable sliders.

5. The method of claim 1, wherein the gripper plate is spring-loaded and projecting from the gripper in the direction of the mold tool core.

6. A device for the production of molded parts with several different adjoining decorating regions, comprising:
   a) a mold tool with a mold tool core and a mold tool matrix and
   b) a gripper with a gripper plate and a movable gripper frame for placement of at least one decorating film into the mold tool, wherein
      i) the gripper frame is configured for inserting the decorating film edges into provided grooves,
      ii) the grooves are combined with sliders integrated in the mold tool core, wherein the sliders are movable from the core side into the grooves for displacing the gripper frame after the decorating film edges are fixed in the grooves, and
      iii) the matrix includes webs corresponding to the sliders integrated into the mold tool core for separating the different decorating regions.

7. The device of claim 6, wherein several sliders capable of operating independently are provided as the gripper frame.

8. The device of claim 7, wherein the spring-loaded gripper plate projects from the gripper.

* * * * *